March 25, 1930.                     E. NIBBS                      1,751,653
                             ENGINE CONSTRUCTION
                           Filed Feb. 3, 1928          7 Sheets-Sheet 3

Fig. 4.

Witness:
William P. Kilroy

Inventor:
Ernest Nibbs
By Brown, Jackson, Boettcher & Dienner
Attys

March 25, 1930.                    E. NIBBS                    1,751,653
                             ENGINE CONSTRUCTION
                            Filed Feb. 3, 1928            7 Sheets-Sheet 4

Fig. 5.

Witness:
William P. Kilroy

Inventor:
Ernest Nibbs
By Brown, Jackson, Boettcher & Diener
Attys

Fig. 7

March 25, 1930.     E. NIBBS     1,751,653
ENGINE CONSTRUCTION
Filed Feb. 3, 1928          7 Sheets-Sheet 7

Fig. 8.

Witness:
William P. Kilroy

Inventor:
Ernest Nibbs
By Brown, Jackson, Boettcher & Dienner
Attys

Patented Mar. 25, 1930

1,751,653

UNITED STATES PATENT OFFICE

ERNEST NIBBS, OF NEW LONDON, CONNECTICUT, ASSIGNOR TO ELECTRIC BOAT COMPANY, OF GROTON, CONNECTICUT, A CORPORATION OF NEW JERSEY

ENGINE CONSTRUCTION

Application filed February 3, 1928. Serial No. 251,498.

This invention relates to internal combustion engines, and more particularly to the construction and arrangement of the cylinders and the cylinder block and associated parts of the engine.

Internal combustion engines as at present constructed are, in general, excessively heavy for the power developed and the parts of such engines are not readily accessible for cleaning, repairs and replacement. This is particularly true of double acting engines whether such engines be two cycle or four cycle. I have found that these objections can be avoided by providing a suitable cylinder block and disposing the cylinders at opposite sides or faces of this block and connecting them thereto in such manner that the stresses to which the cylinders are subjected are transmitted to the block thus relieving the water jacket, where used, of all stresses except those incident to the water pressure. This permits the use of very thin water jackets which may be formed of sheet metal. By removably securing the cylinder liners to the block, the engine can be quickly and easily assembled and disassembled and the cylinder liners can be quickly removed to give ready access to the interior thereof and to the cylinder block, when desired. By my invention I provide a light, rigid and inexpensive arrangement of parts giving ready access to the interior of the cylinders or the block and effectively bracing all parts subjected to stresses. My invention is illustrated as applied to a double acting two cycle engine of the Diesel type, for which it is well adapted. In its broader aspects, however, my invention is also well adapted for the construction of engines of other types either single acting or double acting. Further objects and advantages of my invention will appear from the detail description.

My engine includes a bed plate 1 of known construction upon which are mounted upwardly tapering lower supporting frames 2 in the form of hollow blocks of substantially channel or rectangular cross-section. Upper and supporting frames 3, also in the form of hollow blocks, are mounted upon the upper ends of the blocks 2 and support a cylinder block 4 which seats upon the blocks or frames 3. Tie rod bolts 5 are anchored at their lower ends at 6 in the bed plate 1 and extend upwardly through the frames 2 and 3 and the cylinder block 4, nuts 7 being threaded onto the upper ends of the tie rod bolts 5 and cooperating therewith to secure the bed plate and the associated frames and cylinder block together in assembled relation. By removing the nuts 7 the parts secured together by the bolts can be readily disassembled. In practice the spaces between the frames 2 at the opposite sides of the engine are closed by suitable panels, as shown, the cylinders being disposed between adjacent sets of supporting frames and there being one more set of these frames than there are cylinders, as illustrated. The cross heads are mounted to reciprocate in suitable guides secured to the supporting frames 2 and are secured to the piston rod to be reciprocated thereby in a known manner. These cross heads and the method of mounting the same and connecting them to the piston rod are well known in the art and it is not necessary to illustrate or describe the same in detail here.

The cylinder block 4 supports the cylinder liners and associated parts and serves to transmit the stresses incident to the operation of the engine, to the bed plate 1 through the tie rod bolts 5 and supporting frames 2 and 3 and associated parts. Referring more particularly to Figures 4 to 8, the block 4 is provided with an integral cylinder section 8 disposed centrally thereof, this section being bored out to the proper cylinder diameter. The cylinder block is provided in each face with two recesses 9 and 10 disposed in concentric relation to each other and to the bore of cylinder section 8, these recesses being disposed in stepped arrangement. The block is further provided with an outer recess 11 which is relatively shallow and is concentric with the recess 10. This outer recess receives an outwardly projecting flange 12 provided adjacent the lower end of a sheet metal water jacket 13 disposed about a cylinder liner 14, this flange being formed by bending the water jacket reversely upon itself. The jacket is extended a short distance beyond flange 12 and is secured to the liner 14 at 15 by welding or in any other suitable manner. At its upper end the water jacket 13 is turned outwardly to form a flange 16 which fits into a corresponding recess in the inner face of a flange 17 at the outer end of liner 14, the flange 16 being secured to flange 17 in a suitable manner, as by welding. A cylinder head 18 is mounted upon flange 17 and receives a centrally disposed fuel injection nozzle 19 of known type to which fuel is supplied under pressure in a known manner. The liners at the opposite faces of the block are of similar construction and are mounted in the same manner in all respects. The head 20 for the lower liner is of somewhat different construction than the head 18 and is provided with a central stuffing box 21 through which operates the piston rod 22, the upper end of which is secured to the piston 23 which operates in the cylinder. The head 20 is provided with two fuel injection nozzles 23ª similar to the nozzle 19 and disposed at opposite sides of the piston rod 22. Preferably, though not necessarily, each of the water jackets 13 is provided with a corrugated portion 13ª which facilitates expansion and contraction of the water jacket and also acts, to a certain extent, to hold the flange 12 firmly seated in its recess providing, in effect, a packing or closure about the lower portion of the cylinder liner 14.

Figure 4:
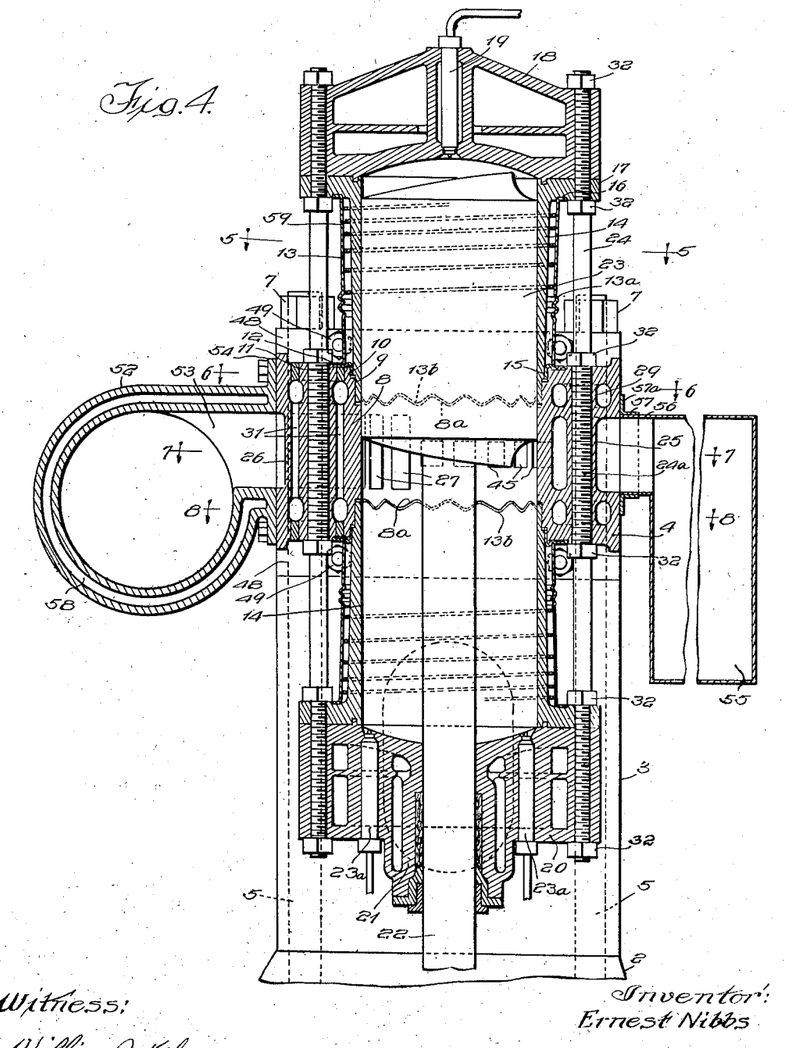
Fig. 4 is a transverse vertical section through one of the engine cylinders and associated parts, parts being shown in elevation.
Figure 5:
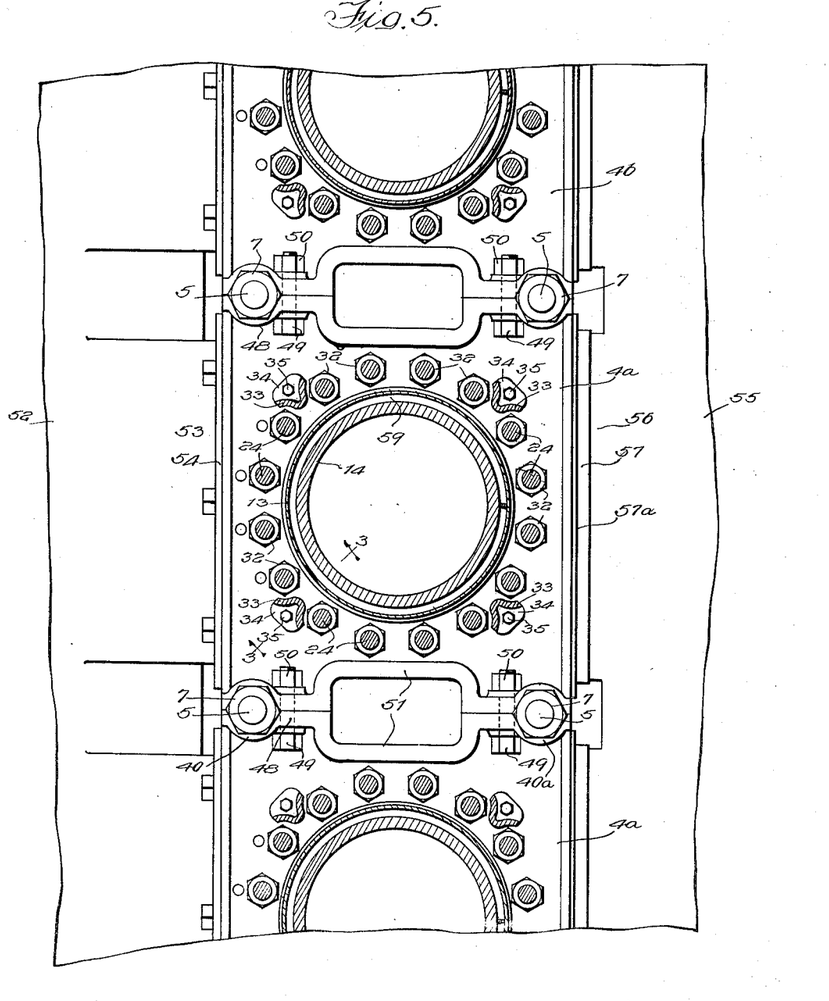
Fig. 5 is a section taken substantially on line 5—5 of Fig. 4.

As will be noted more clearly from Fig. 4, each end of the cylinder wall of cylinder section 8 is of scallop or undulatory conformation as at 8ª, and the inner end 13ᵇ of the cylinder liner 14 is also of undulatory conformation. This eliminates the possibility of the piston striking a shoulder or projecting element of appreciable extent in the event of the liner wall becoming out of register with the wall of cylinder section 8ª so as to project inwardly slightly beyond the same, due to unequal expansion or other causes. The effect of thus shaping the adjacent ends of the cylinder section 8 and of the liners 14 is to eliminate a straight line of connection between the cylinder sections and the liners in the plane of the blocks, providing instead a joint or connection, the walls of which are inclined relative to the blocks, with the advantages noted.

Figure 6:
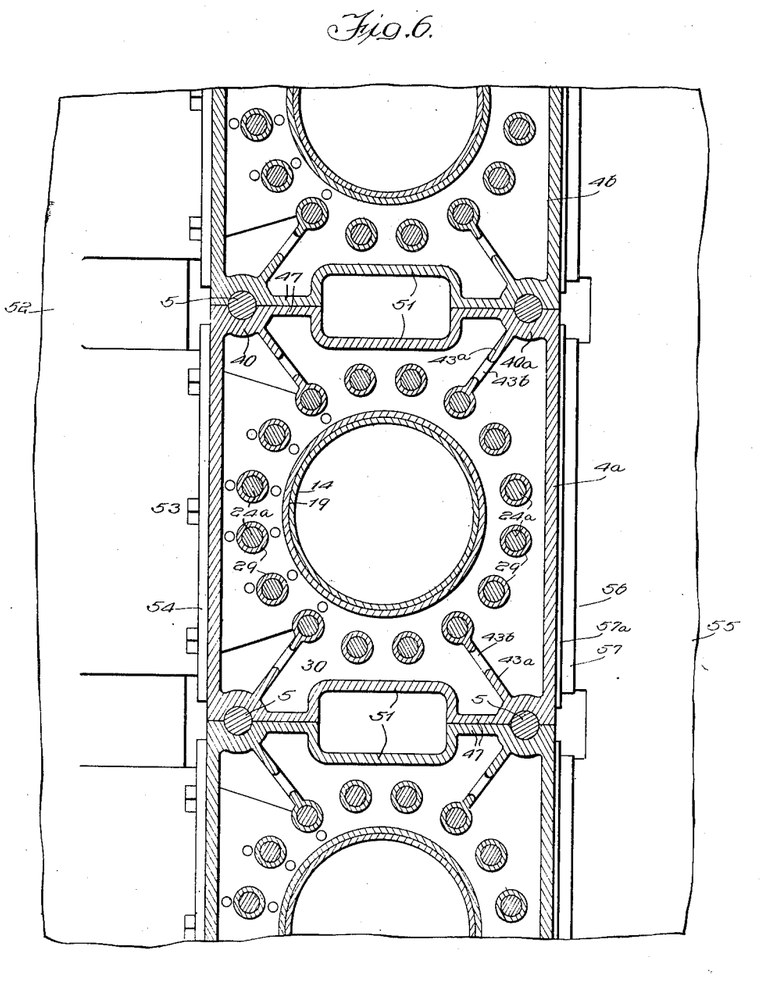
Fig. 6 is a section taken substantially on line 6—6 of Fig. 4.
Figure 7:
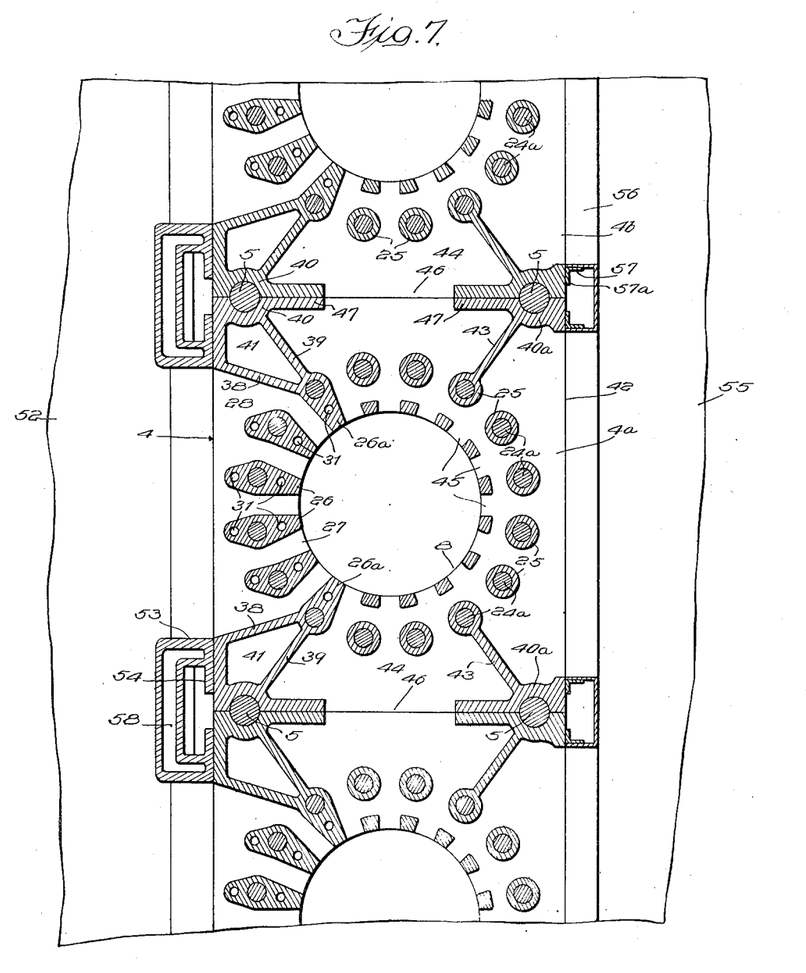
Fig. 7 is a section taken substantially on line 7—7 of Fig. 4.
Figure 8:
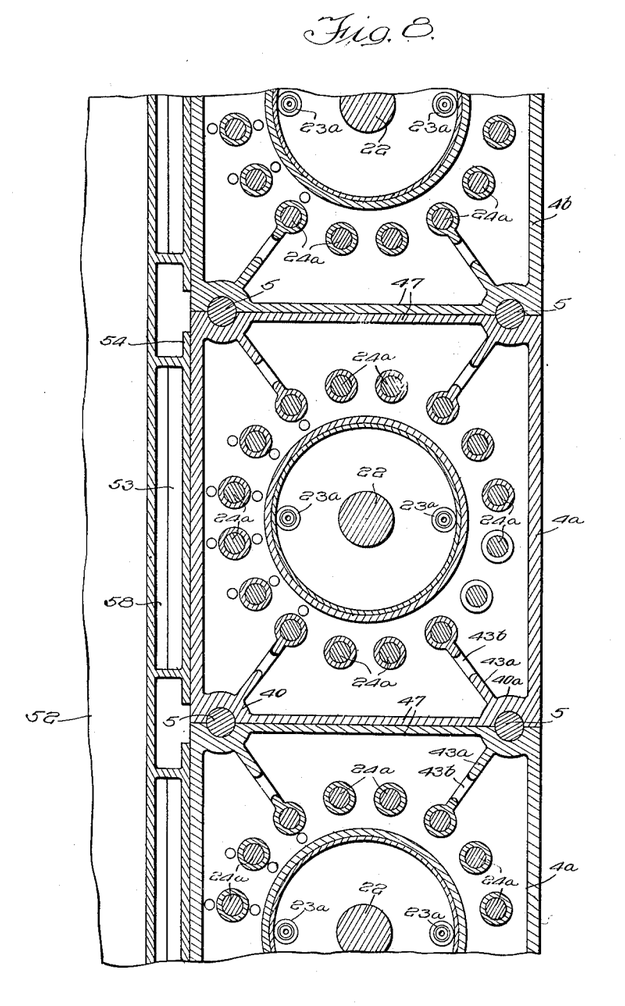
Fig. 8 is a section taken substantially on line 8—8 of Fig. 4.

The cylinder liners and heads are secured to the blocks 4 by rod bolts 24 which pass through the blocks and through the flanges 17 of the liners, these rod bolts also passing through the cylinder heads. As will be noted more clearly from Figure 7, certain of these bolts pass through tubular posts or sleeves 25 integral with the block 4 and extending between the upper and lower walls thereof. The other bolts 24 extend through inwardly tapering elements or vanes 26 which are spaced apart to provide exhaust passages 27 opening into exhaust space 28 of the block. The block is further provided with relatively short thimbles or sleeves 29 integral therewith and forming continuations of the sleeve 25 and the vanes 26, these relatively short thimbles or sleeves extending across the water spaces 30 at the top and bottom of the block (Figs. 6 and 8). The baffles or vanes 6 also have water passages 31 establishing communication between these water spaces whereby these vanes are water cooled.

As will be noted more clearly from Fig. 4, each of the rod bolts 24 has a slightly enlarged central portion 24ª of somewhat greater length than the thickness of block 4. Nuts 32 are screwed upon this portion 24ª and bear against the opposite faces of block 4 so as to effectively secure the bolt rod 24 against endwise movement through the block, these nuts also providing means for properly adjusting the bolts. The outer reduced portions of the bolts receive nuts 32 threaded thereon and bearing against the inner face of flange 17 and the outer face of the cylinder head, respectively. The bolts and the nuts associated therewith thus provide simple and efficient means for effectively securing the cylinder liners to the block and for securing the cylinder heads on the liners, proper adjustment of the various parts being readily effected by screwing the nuts onto or off of the rod bolts as conditions require.

Figure 1:
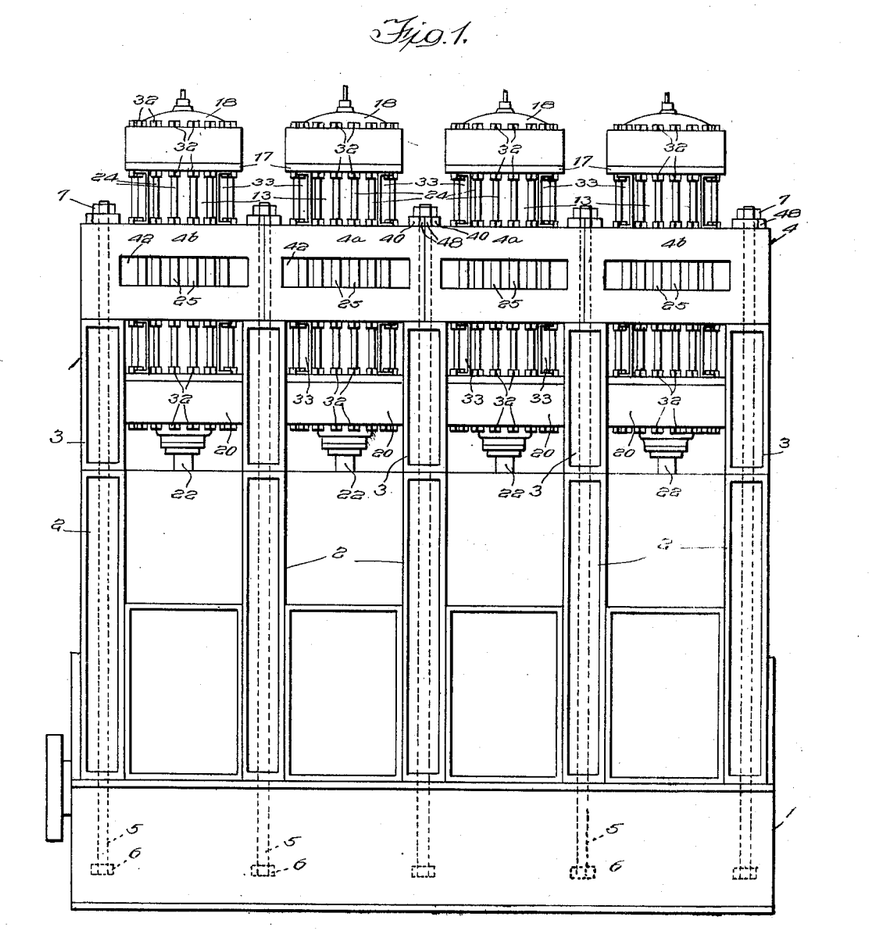
Fig. 1 is a side view of a double acting two cycle Diesel type of engine constructed in accordance with my invention, this view being taken from the scavenging air inlet manifold side and the air inlet manifold being omitted for clearness.
Figure 2:
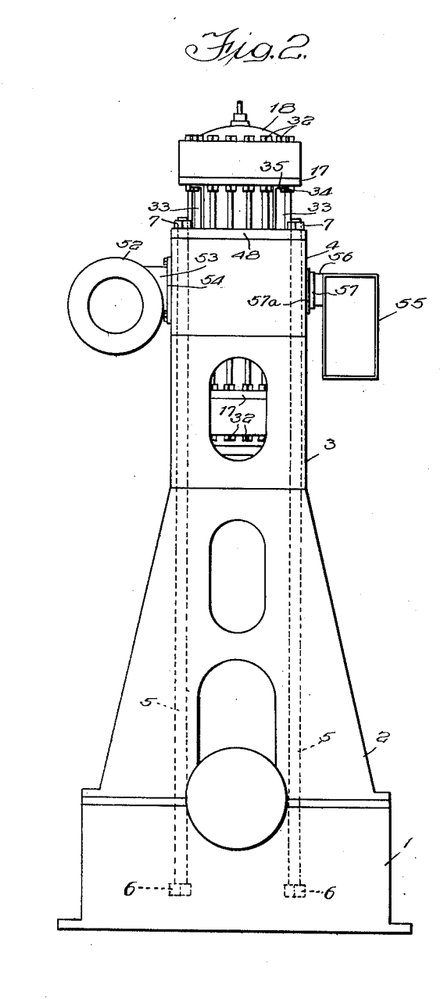
Fig. 2 is an end view of the engine.
Figure 3:
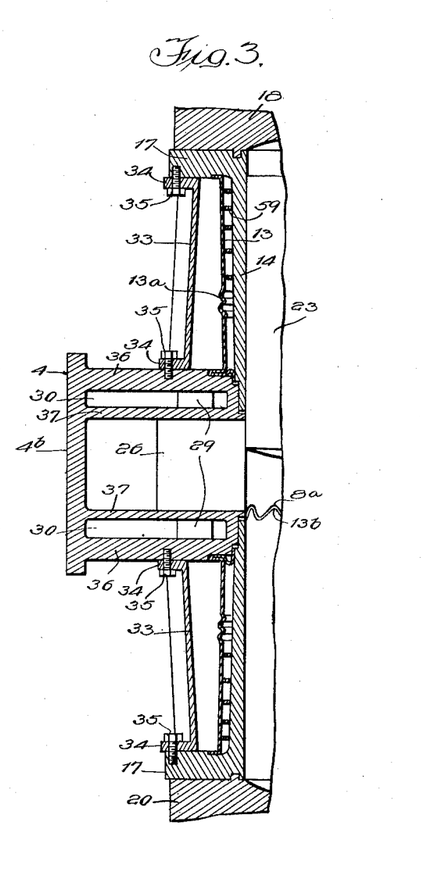
Fig. 3 is a fragmentary section taken substantially on line 3—3 of Fig. 5.

As will be noted more clearly from Figs. 3 and 4, the ends of the liners are spaced a short distance away from the ends of the wall of cylinder section 8, this distance being sufficient to accommodate expansion of the parts during operation of the engine. To insure that the distance between the liners and the ends of the wall of cylinder section 8 will at times be sufficient to accommodate expansion of the parts, I provide spacers or distance pieces 33 of approximately V-shape in cross section (Fig. 5), each of these pieces being provided with end flanges 34 which seat upon the block 4 and the inner face of flange 17 of cylinder liner 14. These flanges 34 are secured to the block and to the flange of the cylinder liner, respectively, by cap screws 35. The spacers 33 are of such length that the end of the liner will be properly spaced from the adjacent end of the wall of cylinder section 8 when the liner flange 17 seats upon the outer flange 34 of the spacer 33. In assembling the blocks and the cylinder liners and associated parts, the bolts 24 are first secured through the block in proper position in the manner described. The inner nuts 32 are then screwed onto the bolts a proper distance to permit flange 17 to contact with the outer flanges 34 of the spacers 33. These spacers are then secured to the blocks 4 and flange 17 in the manner stated, the nuts 32 being first turned outwardly upon the rod bolt so as to bear firmly against the inner face of flange 17 and take the load of the liner 14 off of the spacers 33. The cylinder heads are then placed in position over the end portions of the bolt and the outer nuts 32 are turned tightly into position and co-act with the inner nuts 32 to effectively secure the heads upon the liners. In this manner the cylinder liners and heads can be quickly and easily assembled in proper relation to the cylinder section 8 and to each other and are secured to the block 4 in such manner that the stresses incident to the operation of the engine are transmitted to this block and from the block to the bed plate in the manner previously described. This provides a light but rigid structure which can be readily assembled and disassembled and which possesses ample strength to withstand the stresses to which the engine is subjected in use.

The cylinder block 4 may be formed of a single casting or unit or may be built up of separate blocks or sections suitably secured together. I have illustrated the cylinder block as formed of four sections, including the two center sections 4ª and the end sections 4ᵇ, there being one section for each cylinder. As more clearly shown in Fig. 3, each of these sections is provided with outer top and bottom walls 36 and inner top and bottom walls 37 spaced away from the walls 36 and defining therewith, and with the side and end walls of the block section, the water spaces 30. Each block section is provided with an exhaust opening through one side thereof forming the outlet for the exhaust space 28 previously referred to, this space being defined by the top and bottom walls 37 and webs 38 extending from the terminal exhaust baffles or vanes 26ª. Vane 26ª is connected by web 39 to a boss 40 which is shaped to form one-half of a socket for one of the tie rod bolts 5, this boss 40 being in register with a similar boss of the adjacent section. The webs 38 and 39, together with the boss 40 and the vane 26ª and the end portion of the side wall of the block section define a vertical passage 41 which establishes communication between the water spaces 30.

The block section is provided at its other side with an inlet opening 42 for the admission of scavenging air, this opening extending substantially the full length of the block section between bosses 40ª similar to the bosses 40. Strengthening webs 43 extend between the walls 37 and connect certain of the bolts receiving sleeves or posts 25 with the bosses 40ª. Each block section is thus provided with an air space 44 of relatively great area extending between the walls 37 to the webs 39. This space communicates with the cylinder section 8 by means of scavenging air inlet openings 45 provided through the wall of the cylinder section for this purpose. As will be noted more clearly from Fig. 7, the air spaces 44 of the center sections 4ª are in communication with each other and with the air spaces of the end sections 4ᵇ through openings 46 provided in the end walls of the respective sections. As will be noted more clearly from Figs. 6 and 8, the end walls 47 of the block sections are continuous at the ends of the water spaces 30 so that the water jackets of these blocks or sections are not in communication, in the form illustrated, though suitable openings may be provided through the end walls of the inner block sections for establishing communication between the water spaces if desired. Preferably the strengthening webbs 43 shown in Fig. 7 are extended through the water spaces to provide strengthening web elements 43ª, each of which is provided with an opening 43ᵇ to facilitate circulation of the water. The end walls 47 of the block sections are extended beyond the opposite faces thereof to form end flanges 48 which are provided with aligned openings receiving securing bolts 49 upon which are threaded nuts 50 for securing the block sections together. Preferably, though not necessarily, each of the top end flanges 48 is provided with an offset portion 51 and the end wall of which the flange forms a continuation is similarly offset to the top inner wall 37 of the block. The offsets 51 provide hand holds for handling the block sections when assembling the engine. The cylinder block 4, formed in sections constructed in the manner illustrated and described, can be readily assembled and it is then secured to the bed plate and supporting frames by the tie rod bolts in the manner previously described. The end block sections 4ᵇ are similar in all respects to the sections 4ª except that the end sections are, of course, closed at their outer ends, the outer walls and flanges of these end sections are not shaped to provide the hand holds, and instead of having bosses for reception of the tie rod bolts the end sections are provided with openings which receive and completely encircle the bolts.

To take off the exhaust gases I provide an exhaust manifold 52 which has integral necks 53 disposed and shaped to register with the outlet openings leading from the exhaust spaces 28. Each neck 53 is provided, at its inner end, with a peripheral flange 54 by means of which the neck is suitably secured, as by bolting, to the cylinder block. The exhaust gases flow into the manifold 52 through the necks 53 thereof and are discharged from the manifold in a known manner. An air inlet header or manifold 55, which may be formed of sheet metal, is disposed at the other side of the cylinder block and is provided with a plurality of extensions or necks 56 shaped and disposed to register with air inlet openings 42. Each neck 56 is provided, at its inner end, with a rim 57 of angle cross section, the vertical flange 57ª of this rim seating on the lateral face of cylinder block 4 and being secured thereto in a suitable manner, as by means of suitable cap screws or screw studs and bolts threaded thereon. As will be noted more clearly from Fig. 4, the exhaust spaces or passages 27 between the vanes 26 are of much greater height than the air inlet openings 45 and extend above and below the same. In operation of the engine, as the piston approaches the end of its stroke in either direction, the exhaust openings are first uncovered, permitting escape of the exhaust gases and lowering of the pressure in the cylinder, after which the air inlet openings 45 are uncovered, permitting a large volume of air to flow into the cylinder so as to thoroughly scavenge it and charge the cylinder with a fresh supply of air for supporting combustion during the succeeding combustion stroke. As the air space for admitting air to each cylinder is of relatively great extent and the air inlet manifold 55 is of ample volume, the admission of a large volume of air to the cylinder for scavenging and recharging is assured, which contributes materially to the efficiency of operation of the engine.

As will be noted more clearly from Figs. 4, 7 and 8, the exhaust manifold 52 is provided with a water space 58, this space also extending about the extension or neck 3. This water space and the water jackets and the water spaces of the cylinder block sections and the cylinder heads are all connected to a suitable source of supply of water or other suitable cooling liquid which is circulated through the water jackets and water spaces by a pump or equivalent means, or by thermo-gravity means. Preferably, though not necessarily, each of the water jackets is provided with a spiral vane 59 extending about the outer portion of the cylinder liner for deflecting the water about the same into contact therewith.

An engine constructed in the manner illustrated and described can be readily assembled or disassembled and either one or both of the cylinder liners and associated parts can be quickly and easily removed to give ready access to the interior of the engine for replacements, repairs or other purposes. It is to be noted that the rod bolts 24 are subjected to tension only and that this tension is transmitted by these bolts to the block 4, which is securely anchored by the tie rod bolts 5 to the bed plate, these tie rod bolts also being subjected to tension only, the downward or compressive stresses being transmitted to the supporting frames or blocks 2 and 3 and the bed plate 1 which are amply able to withstand such stresses. The engine thus constructed, is, therefore, capable of withstanding unusually severe stresses and as a result can be so constructed as to be of unusually light weight for the power developed. This is, from a pactical standpoint, an important advantage resulting from my construction, in addition to the ease with which the engine can be assembled and disassembled and the ready accessibility of parts.

What I claim is:—

1. In an internal combustion engine, a cylinder block including a cylinder section provided with exhaust openings, cylinder liners at opposite faces of the block and in register with said cylinder section, heads for the outer ends of the liners, and means for removably securing the heads on the liners, said means also removably securing the liners to the block and directly connecting the heads together.

2. In an internal combustion engine, a cylinder block including a cylinder section provided with exhaust openings, cylinder liners at opposite faces of the block and in register with said cylinder section, the liners being flanged at their outer ends, heads for the liners, tie bolts extending through the cylinder block and through the flanges and heads of the liners, and nuts screwed on said bolts and cooperating therewith for removably securing the liners and the liner heads together and for removably securing the liners to the block.

3. In an internal combustion engine, a cylinder block including a cylinder section and provided in each face with two recesses extending from the bore of the cylinder section concentric therewith and in stepped arrangement, cylinder liners extending into the inner recesses, water jackets carried by the liners and having flanges seating in the outer recesses, and means for removably securing the liners to the block with their inner ends spaced away from the ends of the wall of the cylinder section.

4. In an internal combustion engine, a cylinder block including a cylinder section, liners at opposite faces of the block and in register with the bore of said cylinder section, said liners having outwardly projecting flanges at their outer ends, spacers between said flanges and the block acting to maintain the inner ends of the liners in predetermined spaced relation to the ends of the wall of said cylinder section, means for effecting a closure about the inner end portions of the liners, and means for removably securing the liners to the block.

5. In an internal combustion engine, a bed plate, supporting frames seating on the bed plate, a cylinder block seating on the frames and including cylinder sections, liners at opposite faces of the block and in register with the cylinder sections, heads for the liners, means for removably securing the block and the frames and the bed plate together, and common means for removably securing the heads on the liners, said means also removably securing the liners to the block.

6. In an internal combustion engine, a bed plate, supporting frames seating on the bed plate, a cylinder block seating on the frames and including cylinder sections, liners at opposite faces of the block and in register with the cylinder sections, said liners being flanged at their outer ends, heads for the liners, bolt rods passing through the block and through the liner flanges and heads, nuts screwed onto the bolt rods and cooperating therewith for removably and adjustably securing the block and the liners and the heads thereof in assembled relation, tie rod bolts anchored in the bed plate and passing through said frames and the block, and nuts screwed upon said tie rod bolts and cooperating therewith for removably securing the bed plate and the frames and the block in assembled relation.

7. In an internal combustion engine, a bed plate, supporting frames seating on the bed plate, a cylinder block seating on the frames and comprising cylinder sections, liners at opposite faces of the block and in register with the cylinder sections, heads for the liners, tension members passing through the block and securing the heads together and in operative relation to the liners, and tie rods securing the block and the frames and the bed plate together.

8. In an internal combustion engine, a bed plate, supporting frames seating on the bed plate, a cylinder block seating on the frames and comprising cylinder sections, liners at opposite faces of the block and in register with the cylinder sections, heads for the liners, tension members securing the heads together and in operative relation to the liners, and tie rods securing the block and the frames and the bed plate together.

9. In an internal combustion engine, a bed plate, supporting frames on the plate, a cylinder block seating on the frames and comprising a cylinder section, means for securing the plate and the frames and block together, liners at opposite sides of the block and in register with the cylinder section, heads for the liners, and means for securing the heads together and in operative relation to the liners.

10. In an internal combustion engine, a cylinder block comprising a cylinder section, a pair of liners at opposite sides of the block and in register with the cylinder sections, heads for the liners, and tension members connecting the heads and holding them in operative relation to the liners, said members also holding the liners against movement away from the block.

11. In an internal combustion engine, a cylinder block comprising a cylinder section and having recesses in its opposite faces concentric with said section, a pair of liners at opposite sides of the block and seating in said recesses, heads for the liners, and tension members securing the heads together and exerting pressure thereon toward the block.

12. In an internal combustion engine, a cylinder block comprising a cylinder section and having recesses in its opposite faces concentric with said section, liners seating in said recesses and disposed at opposite sides of the block, heads for the liners having outwardly projecting flanges, tension bolts passing through the block and through the flanges of the heads, and abutment members carried by the bolts and contacting the outer faces of the head flanges, certain of said members screwing onto the bolts.

In witness whereof, I hereunto subscribe my name this 30th day of January, 1928.

ERNEST NIBBS.